(12) United States Patent
Matsuda et al.

(10) Patent No.: US 10,107,161 B2
(45) Date of Patent: Oct. 23, 2018

(54) BREATHER DEVICE FOR COMBUSTION ENGINE

(71) Applicant: Kawasaki Jukogyo Kabushiki Kaisha, Hyogo (JP)

(72) Inventors: Yoshiharu Matsuda, Akashi (JP); Kazuki Arima, Kobe (JP); Yasushi Ishibashi, Akashi (JP); Akira Tomofuji, Kato (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 513 days.

(21) Appl. No.: 14/754,428

(22) Filed: Jun. 29, 2015

(65) Prior Publication Data

US 2016/0032797 A1 Feb. 4, 2016

(30) Foreign Application Priority Data

Jul. 29, 2014 (JP) ................................. 2014-153656
Jul. 29, 2014 (JP) ................................. 2014-153657

(51) Int. Cl.
*F02B 25/06* (2006.01)
*F02B 33/00* (2006.01)
*F01M 13/04* (2006.01)
*F02B 33/04* (2006.01)
*F02B 33/24* (2006.01)
(Continued)

(52) U.S. Cl.
CPC .......... *F01M 13/04* (2013.01); *B01D 46/0031* (2013.01); *F02B 33/04* (2013.01); *F02B 33/24* (2013.01); *F02M 25/06* (2013.01); *F02M 35/10222* (2013.01); *F01M 2013/0038* (2013.01); *F01M 2013/0438* (2013.01); *F01M 2013/0461* (2013.01); *F02M 35/162* (2013.01); *Y02T 10/121* (2013.01)

(58) Field of Classification Search
CPC .......... F01M 13/04; F01M 2013/0438; F01M 2013/0461; F01M 2013/0038; F02B 33/04; F02B 33/24; F02M 35/10222; F02M 35/162; F02M 25/06
USPC .............................. 123/559.1, 572, 573, 574
See application file for complete search history.

(56) References Cited

U.S. PATENT DOCUMENTS 4,528,969 A * 7/1985 Senga .................... F01M 13/04
123/572
6,142,129 A * 11/2000 Hori ......................... F01L 1/02
123/55.2
(Continued)

FOREIGN PATENT DOCUMENTS

JP 2007-077925 3/2007

OTHER PUBLICATIONS

U.S. Appl. No. 15/412,944, filed Jan. 23, 2017, is a co-pending application (27 pages).

*Primary Examiner* — Phutthiwat Wongwian
*Assistant Examiner* — Kelsey Stanek

(57) ABSTRACT

A breather device includes: a breather chamber into which oil mist in a crank chamber of a combustion engine is introduced; and a breather passage configured to guide oil mist from a crank chamber into the breather chamber. The breather chamber has formed therein a labyrinth structure in which gas-liquid separation of the oil mist is performed. An introduction pipe forming a part of the breather passage is communicated with an upper portion of the crank chamber, and projects upward from an upper end portion of the crank case.

17 Claims, 9 Drawing Sheets

(51) Int. Cl.
*F02M 35/10* (2006.01)
*B01D 46/00* (2006.01)
*F02M 25/06* (2016.01)
*F02M 35/16* (2006.01)
*F01M 13/00* (2006.01)

(56) References Cited

U.S. PATENT DOCUMENTS

| | | | |
|---|---|---|---|
| 6,354,249 B1* | 3/2002 | Gerhardt | F01P 5/10 |
| | | | 123/25 A |
| 7,318,405 B2 | 1/2008 | Tanaka et al. | |
| 2006/0157004 A1* | 7/2006 | Gunji | F01L 1/022 |
| | | | 123/54.4 |
| 2007/0062480 A1 | 3/2007 | Tanaka et al. | |
| 2007/0062500 A1* | 3/2007 | Arima | F01M 11/02 |
| | | | 123/572 |
| 2010/0126479 A1* | 5/2010 | Shieh | F01M 13/04 |
| | | | 123/573 |
| 2010/0319665 A1* | 12/2010 | Li | F01M 1/04 |
| | | | 123/573 |
| 2014/0116403 A1* | 5/2014 | Igarashi | F02B 39/16 |
| | | | 123/559.1 |

* cited by examiner

BREATHER DEVICE FOR COMBUSTION ENGINE

CROSS REFERENCE TO THE RELATED APPLICATION

This application is based on and claims Convention priority to Japanese patent applications No. 2014-153656 and No. 2014-153657, filed Jul. 29, 2014, the entire disclosure of which is herein incorporated by reference as a part of this application.

BACKGROUND OF THE INVENTION

Field of the Invention

The present invention relates to a breather device, for a combustion engine, which device includes: a breather chamber into which oil mist including blowby gas in the combustion engine is introduced and in which gas-liquid separation is performed; and a breather passage which guides oil mist from a crank chamber to the breather chamber.

Description of Related Art

In a combustion engine mounted on a motorcycle, oil mist in the combustion engine is introduced into a breather chamber to be subjected to gas-liquid separation therein. Blowby gas obtained through gas-liquid separation performed in the breather chamber is returned into intake air for the combustion engine, and a liquid component is returned to an oil pan (for example, Japanese Laid-Open Patent Publication No. 2007-077925).

In general, a breather chamber is formed integrally with a crank case through die molding. Thus, oil mist including much liquid component tends to be introduced into the breather chamber, and the efficiency in recovering oil mist by means of a breather device including the breather chamber is not high enough.

SUMMARY OF THE INVENTION

An object of the present invention is to provide a breather device, for a combustion engine, which can improve the efficiency in recovering oil mist.

In order to achieve the above object, a breather device for a combustion engine of the present invention includes: a breather chamber into which oil mist in the combustion engine is introduced, the breather chamber having formed therein a labyrinth structure in which gas-liquid separation of the oil mist is performed; and a breather passage configured to guide, into the breather chamber, oil mist from a crank chamber in which a crank shaft is disposed. In the breather device, an introduction pipe forming the breather passage and communicated with the crank chamber is disposed so as to project upward from an upper end portion of a crank case.

According to the above configuration, since oil mist is drawn via the introduction pipe which projects upward from the upper end portion of the crank case, the liquid component falls due to its weight, whereby the liquid component included in the oil mist to be guided into the breather chamber is reduced. Accordingly, the efficiency in recovering the oil mist is improved. That is, the liquid component to be recovered can be reduced, and the ratio of the gas component to be recovered can be increased. Moreover, since the breather passage is formed outside the combustion engine, the degree of freedom in arrangement and structural design of the breather chamber is improved.

In the present invention, preferably, the breather chamber is formed so as to be elongated in an up-down direction or vertical direction, an upper opening through which a gas component of the oil mist is discharged is formed in an upper portion of the breather chamber, and a lower opening through which a liquid component of the oil mist is discharged is formed in a lower portion of the breather chamber. According to this configuration, since the breather chamber is formed so as to be elongated in the vertical direction, gas-liquid separation of the oil mist is promoted.

In a case where the upper opening is formed in the upper portion of the breather chamber, preferably, an outlet of a breather pipe forming the breather passage and communicated with the breather chamber is disposed at a position distanced downwardly away from the upper opening in the breather chamber. According to this configuration, the oil mist having been introduced into the breather chamber can be prevented from going toward the upper opening before being subjected to gas-liquid separation.

In a case where the outlet of the breather pipe is disposed at a position distanced downwardly away from the upper opening, preferably, the combustion engine includes a supercharger, and a blowby gas passage connecting the upper opening to an upstream side of the supercharger in an air intake passage of the combustion engine is formed. The pressure on the upstream side of the supercharger in the air intake passage tends to be negative, and thus, the liquid component tends to flow into the breather pipe. However, according to this configuration, since the liquid component to be guided into the breather chamber can be reduced as described above, entry of the liquid component into the blowby gas passage can be prevented.

In the present invention, preferably, an introduction hole to which the introduction pipe is connected is formed in the upper end portion of the crank case, and the introduction hole is open to a high-pressure region in the crank chamber. According to this configuration, the oil mist is guided from the high-pressure region into the introduction hole, whereby the pressure in the breather chamber is increased. Thus, the liquid component having been discharged from the breather chamber can be prevented from flowing backward into breather chamber.

In a case where the introduction hole is open to the high-pressure region, preferably, the combustion engine includes a rotating body having a protruding portion formed in an outer periphery portion thereof and configured to be rotatably driven in the crank chamber, and the introduction hole is open to a region in which pressure is increased due to rotation or by the effect of rotation of the rotating body in the crank chamber. In this case, for example, the combustion engine includes a plurality of balancer shafts configured to be rotatably driven in the crank chamber, the balancer shafts forming the rotating body, and the introduction hole is open to a vicinity of a balancer shaft that is disposed at an uppermost position among the plurality of the balancer shafts. Since the balancer shaft at the uppermost position has less oil attached thereto, the efficiency in recovering the oil mist is improved.

In a case where the combustion engine includes the rotating body, preferably, the breather device further includes a block member provided in the crank chamber and configured to prevent a liquid component of the oil mist from entering the introduction hole due to centrifugal force or by the effect of rotation of the rotating body. According to this configuration, entry of the liquid component of the oil mist into the introduction hole is suppressed by the block member, and thus, the efficiency in recovering the oil mist is improved.

In the present invention, preferably, the breather device further includes an introduction passage formed in the crank chamber and communicated with the breather passage, the introduction passage being formed perpendicular to an axis of the introduction hole. According to this configuration, before the oil mist is guided into the breather passage, gas-liquid separation of the oil mist is promoted in the introduction passage. Therefore, the efficiency in recovering the oil mist is further improved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, preferred embodiments of the present invention will be described with reference to the drawings. The left and right directions used in the description in this specification refer to the left and right directions relative to a motorcycle rider maneuvering the motorcycle to travel forwards.

Figure 1:
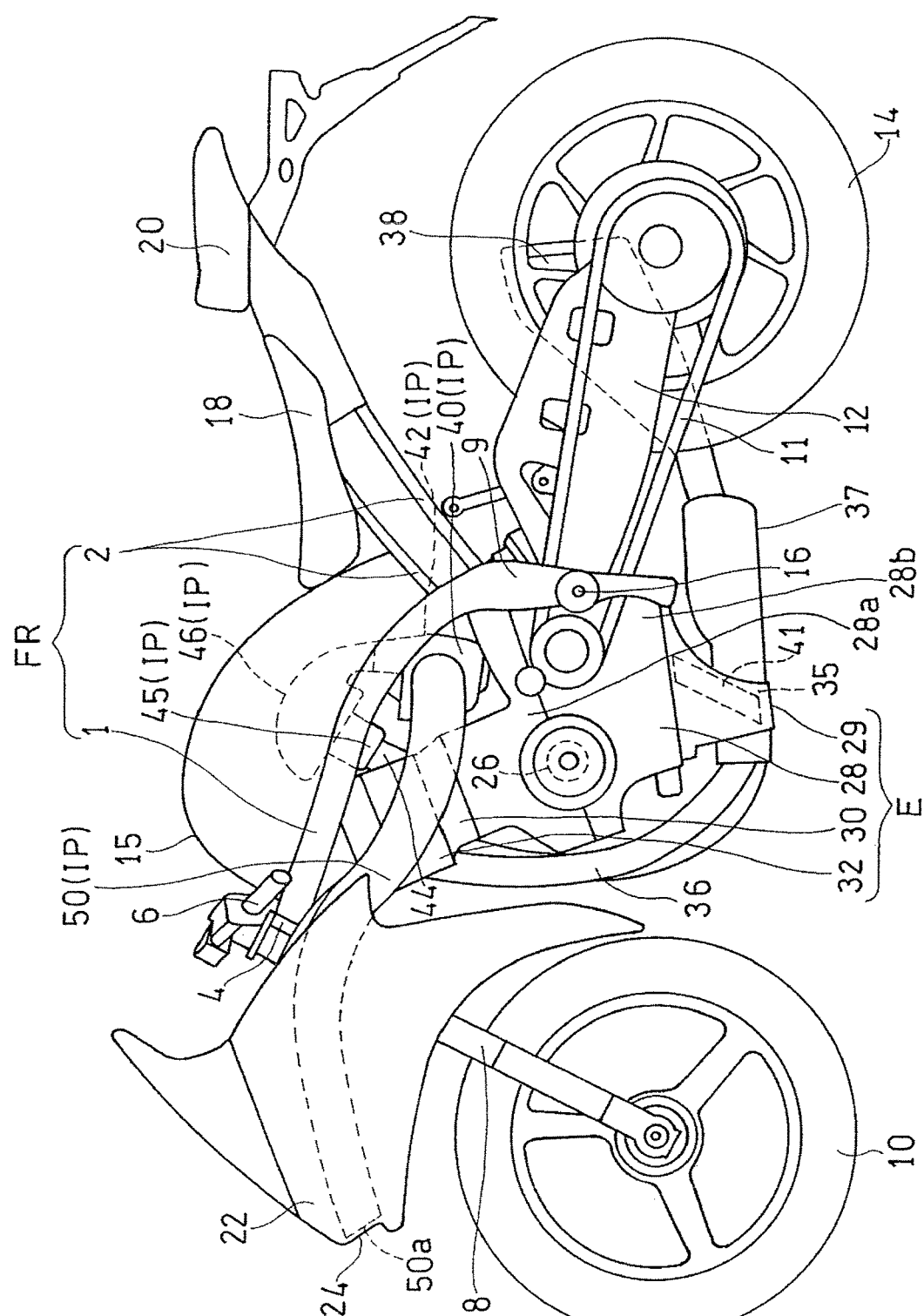
FIG. 1 is a side view showing a motorcycle equipped with a combustion engine which includes a breather device according to a preferred embodiment of the present invention.

FIG. 1 is a side view of a motorcycle equipped with a combustion engine according to a first preferred embodiment of the present invention. A motorcycle frame structure FR for the motorcycle includes a main frame 1 which forms a front half of the motorcycle frame structure FR, and a seat rail 2 which forms a rear half of the motorcycle frame structure FR. The seat rail 2 is mounted on a rear portion of the main frame 1. A head pipe 4 is provided at a front end of the main frame 1, and a front fork 8 is rotatably supported by this head pipe 4 via a steering shaft (not shown). A front wheel 10 is fitted to a lower end portion of the front fork 8, and a steering handle 6 is fixed to an upper end portion of the front fork 8.

Meanwhile, a swingarm bracket 9 is provided at a rear end portion of the main frame 1, which portion is a lower intermediate portion of the motorcycle frame structure FR. A swingarm 12 is supported for swing movement in a vertical direction about a pivot shaft 16 fitted to the swingarm bracket 9. A rear wheel 14 is rotatably supported by a rear end portion of the swingarm 12. A combustion engine E is fitted to the lower intermediate portion of the motorcycle frame structure FR at the front side of the swingarm bracket 9. This combustion engine E drives the rear wheel 14 via a drive chain 11. The combustion engine E is in the form of a parallel multi-cylinder water-cooled combustion engine having four cylinders with four cycles. It is, however, to be noted that the number of cylinders, the type, and the like of the combustion engine E are not necessarily limited to those described above.

The combustion engine E includes a crank shaft 26 which has a rotation axis extending in a right-left direction (motorcycle widthwise direction), a crank case 28 which supports the crank shaft 26, an oil pan 29 which is connected to a lower portion of the crank case 28, a cylinder block 30 which projects upward from an upper surface of the crank case 28, and a cylinder head 32 which is provided at the upper side of the cylinder block 30. The crank case 28 is structured by upper and lower cases, i.e., an upper crank case 28a on the upper side and a lower crank case 28b on the lower side. A crank chamber 82 (FIG. 8) in which the crank shaft 26 is disposed is formed in the crank case 28. The crank chamber 82 includes a gear chamber which accommodates a change gear train disposed rearward of the crank shaft 26. An oil reservoir 35 is formed within the oil pan 29, and an oil strainer 41 which sucks oil OL is disposed in the oil reservoir 35.

Four exhaust pipes 36 are fluid connected with four exhaust ports in a front surface of the cylinder head 32, respectively. These four exhaust pipes 36 are merged together at a collecting exhaust pipe 37 below the combustion engine E, and are then fluid connected with a muffler 38 disposed at the right side of the rear wheel 14.

A fuel tank 15 is disposed on an upper portion of the main frame 1 and a driver's seat 18 and a fellow passenger's seat 20 are supported by the seat rail 2. Also, a fairing 22 made of resin is mounted on a front portion of the motorcycle frame structure FR.

An air intake duct 50 is disposed on the left side of the motorcycle frame structure FR. The air intake duct 50 is supported by the head pipe 4 such that a front end opening 50a thereof faces an air inlet 24 of the fairing 22. The pressure of air introduced through the front end opening 50a of the air intake duct 50 is increased by a ram effect when the air flows in the air intake duct 50. The air intake duct 50 may be disposed on the right side of the motorcycle frame structure FR.

An air cleaner 40 which cleans outside air and a supercharger 42 are disposed side by side in the motorcycle widthwise direction with the air cleaner 40 arranged outside, on an upper surface of a rear portion of the crank case 28 and rearward of the cylinder block 30. The air intake duct 50 extends from the front of the combustion engine E and passes the left outside of the cylinder block 30 and the cylinder head 32, to guide incoming wind to the air cleaner 40 as intake air. The supercharger 42 is driven by the power of the combustion engine E, and pressurizes clean air from the air cleaner 40 to supply the pressurized clean air to the combustion engine E.

An intake air chamber 46 is disposed between the supercharger 42 and an intake port 44 of the combustion engine E, and the supercharger 42 and the intake air chamber 46 are directly connected with each other. The intake air chamber 46 reserves high-pressure intake air supplied from the supercharger 42. A throttle body 45 is disposed between the intake air chamber 46 and the intake port 44. The air intake duct 50, the air cleaner 40, the supercharger 42, the intake air chamber 46, and the throttle body 45 cooperate together to form an air intake passage IP of the combustion engine E.

Figure 2:
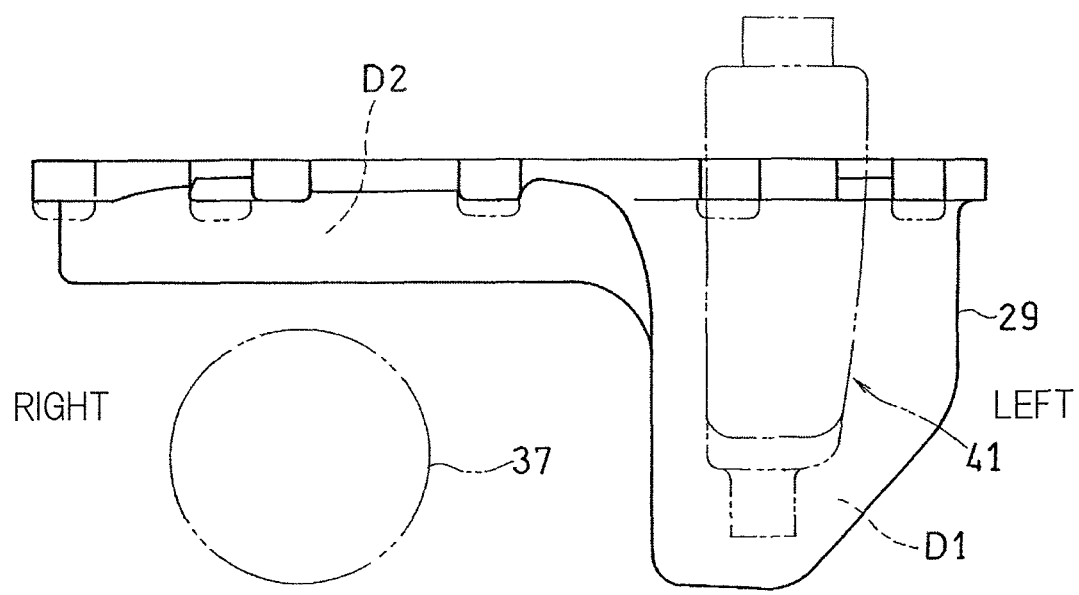
FIG. 2 is a front view showing an oil pan of the combustion engine.

As shown in FIG. 2, a left half of the oil pan 29 defines a deep portion D1, and a right half of the oil pan 29 defines a shallow portion D2 shallower than the deep portion D1. The collecting exhaust pipe 37 is located below the shallow portion D2. That is, a bottom surface of the deep portion D1 is located lower than a bottom surface of the shallow portion D2, and a lower end of a portion of the oil pan 29, which portion corresponds to the deep portion D1, is located at substantially the same height as a lower end of the collecting exhaust pipe 37.

Figure 3:
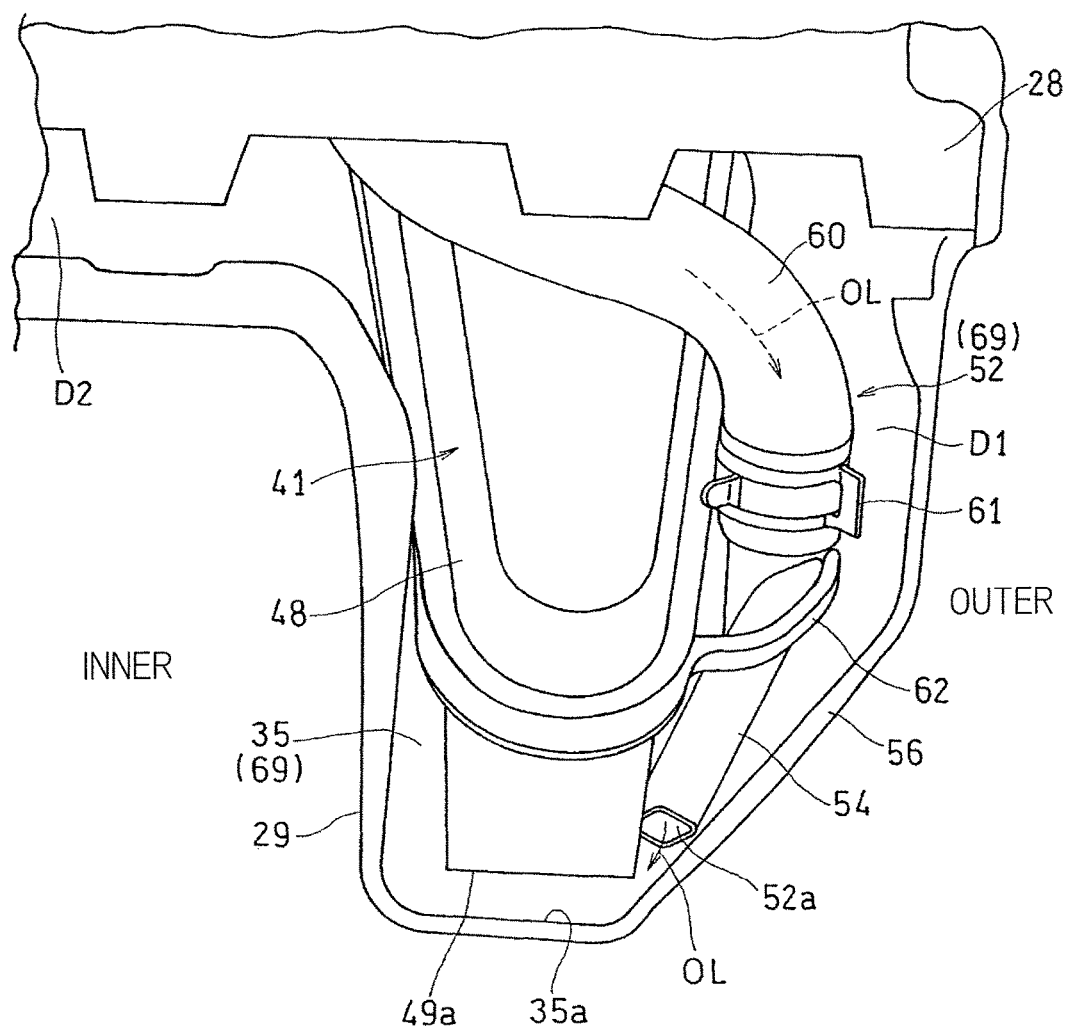
FIG. 3 is a longitudinal cross-sectional view showing the oil pan.

As shown in FIG. 3, a distal end portion 54 which forms an outlet 52a of an oil return pipe 52 is disposed along with the oil strainer 41, in the oil reservoir 35 in the oil pan 29. The distal end portion 54 is disposed on the left side of the oil strainer 41, that is, on the side opposite to the collecting exhaust pipe 37 (FIG. 2) with respect to the oil strainer 41. Accordingly, it is possible to prevent oil near the inlet of the distal end portion 54 from being heated by the collecting exhaust pipe 37 and flowing backward in the distal end portion 54. The oil return pipe 52 returns, to the oil reservoir 35, a part of oil having been supplied from the oil reservoir 35 and remaining in portions, such as the cylinder block 30 and the cylinder head 32, other than the oil reservoir 35 of the combustion engine E. The oil return pipe 52 allows a breather chamber 55 shown in FIG. 4 to be communicated with the oil reservoir 35. The details of the breather chamber 55 will be described later.

The oil return pipe 52 includes the distal end portion 54, a proximal end portion 58 inserted in a lower opening 68 of the breather chamber 55, and a main body portion 60 which connects the distal end portion 54 to the proximal end portion 58. The distal end portion 54 and the proximal end portion 58 are each connected to the main body portion 60 by means of a fixture 61 like a band.

The oil return pipe 52 extends in the vertical direction, and the distal end portion 54 and the proximal end portion 58 thereof are disposed so as to be displaced in a direction perpendicular to the vertical direction, i.e., in the front-rear direction in this preferred embodiment. That is, a part of the main body portion 60 is bent forward, between the distal end portion 54 and the proximal end portion 58. Accordingly, passage resistance in the oil return pipe 52 is increased, and thus, it is possible to prevent oil in the oil pan 29 from flowing backward in the oil return pipe 52.

The oil strainer 41 is made of resin, and includes an upper half case 48 and a lower half case 49. The half cases 48 and 49 are connected to each other with a plate-like oil filter 51 interposed therebetween. The oil strainer 41 is substantially rectangular, and is disposed so as to be inclined upwardly toward the rearward direction in a side view. A strainer inlet 49a is formed in a lower surface of a front portion of the lower half case 49, and a strainer outlet 48a is formed in an upper surface of a rear portion of the upper half case 48.

The distal end portion 54 shown in FIG. 3 is composed of a distal end member 54 which is a member separate from the main body portion 60 of the oil return pipe 52 and which is mounted to the main body portion 60. The distal end member 54 is made from a material having a rigidity higher than that of the main body portion 60 of the oil return pipe 52. Specifically, the main body portion 60 is in the form of a rubber hose and the distal end member 54 is made of synthetic resin or metal.

The distal end member 54 is disposed in the vicinity of a bottom portion 35a of the oil reservoir 35, between the oil strainer 41 and a side wall 56 which forms the outer-side surface of the oil pan 29 in the motorcycle body widthwise direction. A distal end opening 52a of the distal end member 54 which forms the outlet of the oil return pipe 52 is located to a side of the strainer inlet 49a at a lower end of the oil strainer 41, and is disposed higher than the strainer inlet 49a. Since the distal end opening 52a of the distal end member 54 is located higher than the strainer inlet 49a, the distal end opening 52a of the distal end member 54 does not interfere with the strainer inlet 49a. Moreover, the distal end opening 52a of the distal end member 54 is disposed so as to be located always below the oil surface.

Figure 5:
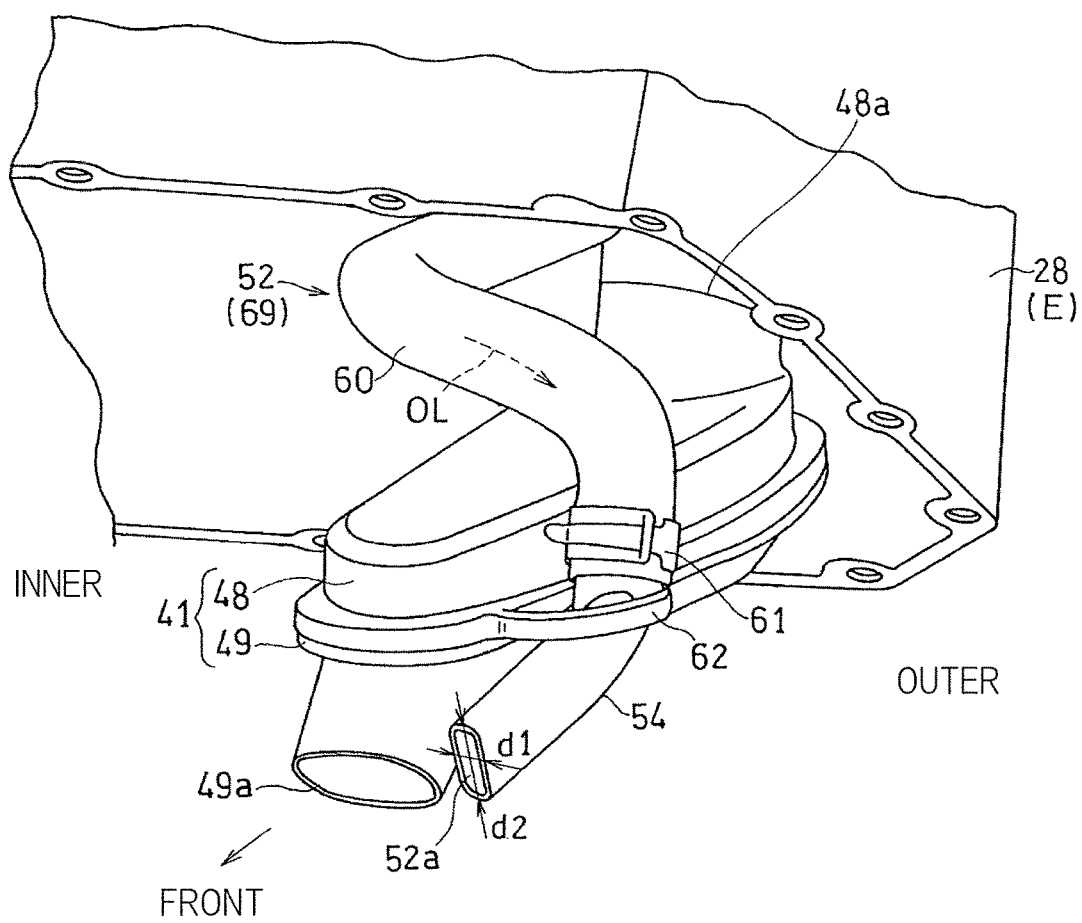
FIG. 5 is a perspective view showing a lower portion of the combustion engine with the oil pan removed.

The distal end member 54 has a tapered outer shape. In this preferred embodiment, the distal end member 54 has a flattened outer shape. In detail, as shown in FIG. 5, the distal end member 54 has, in its cross section, an elongated rectangular shape whose width dimension (dimension in motorcycle widthwise direction) d1 is shorter than the length dimension (dimension in front-rear direction or longitudinal direction) d2 thereof. That is, the outer dimension, of the distal end member 54, that extends in parallel to the side wall 56 of the oil pan 29 is set to be large. The flattened cross-sectional shape of the distal end member 54 is not limited to rectangular, but may be elliptical or oblong. The outer shape of the distal end member 54 may be a cylindrical shape whose diameter is reduced toward its outlet. In this case, the diameter of the cylindrical outer shape of the distal end member 54 may be reduced toward the outlet, gradually or stepwise.

Moreover, the distal end member 54 is configured to have a smaller passage area in its distal end portion than in its proximal end portion connected to the main body portion 60. That is, the distal end member 54 has a so-called tapered shape. The oil reservoir 35 and the oil return pipe 52 cooperate together to form an oil recovery device 69.

Since the main body portion 60 of the oil return pipe 52 is formed by a rubber hose, it is easy to adjust a position of the main body portion 60. In addition, since the oil strainer 41 is inclined, it is easy for the oil return pipe 52 to pass through the vacant space above the front portion of the oil strainer 41.

As shown in FIG. 3, since the side wall 56 which forms the outer-side surface of the oil pan 29 in the motorcycle body widthwise direction is inclined so as to extend outwardly toward the upward direction, the space between the oil strainer 41 and the wall surface of the oil pan 29 is narrowed. However, the distal end member 54 has the flattened outer shape, specifically, has the elongated rectangular shape in its cross section, the distal end member 54 can be easily disposed in such a narrow space.

Figure 4:
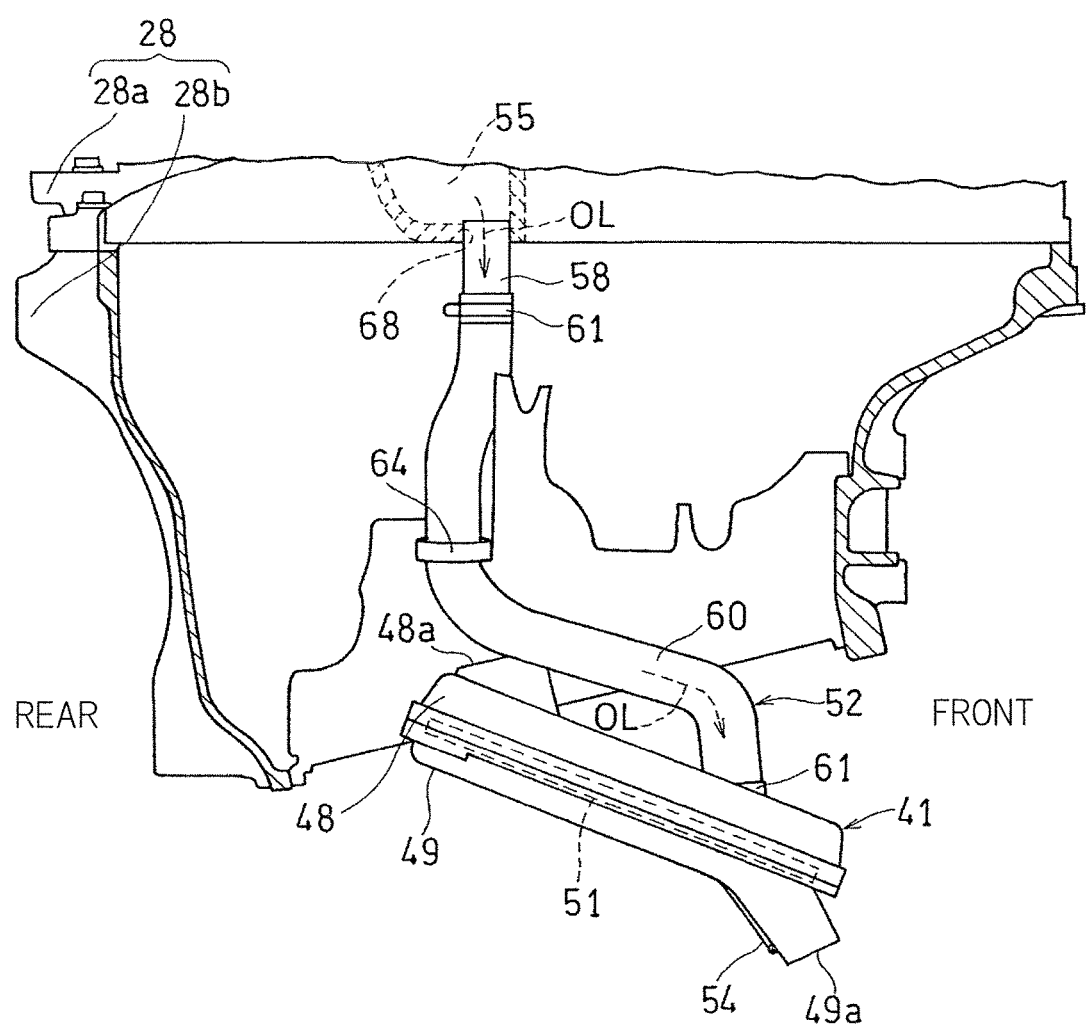
FIG. 4 is a longitudinal cross-sectional view showing a lower crank case of the combustion engine.

A restriction portion 62 which restricts movement of the oil return pipe 52 is provided integrally with the upper half case 48 of the oil strainer 41 through die molding. In the present preferred embodiment, the restriction portion 62 is composed of a ring-like engagement portion formed on the outer-side surface of the upper half case 48, and the distal end member 54 of the oil return pipe 52 is held in the restriction portion 62. As shown in FIG. 4, the main body portion 60 of the oil return pipe 52 is supported by a grip portion 64 which is formed integrally with the lower crank case 28b through die molding.

Figure 6:
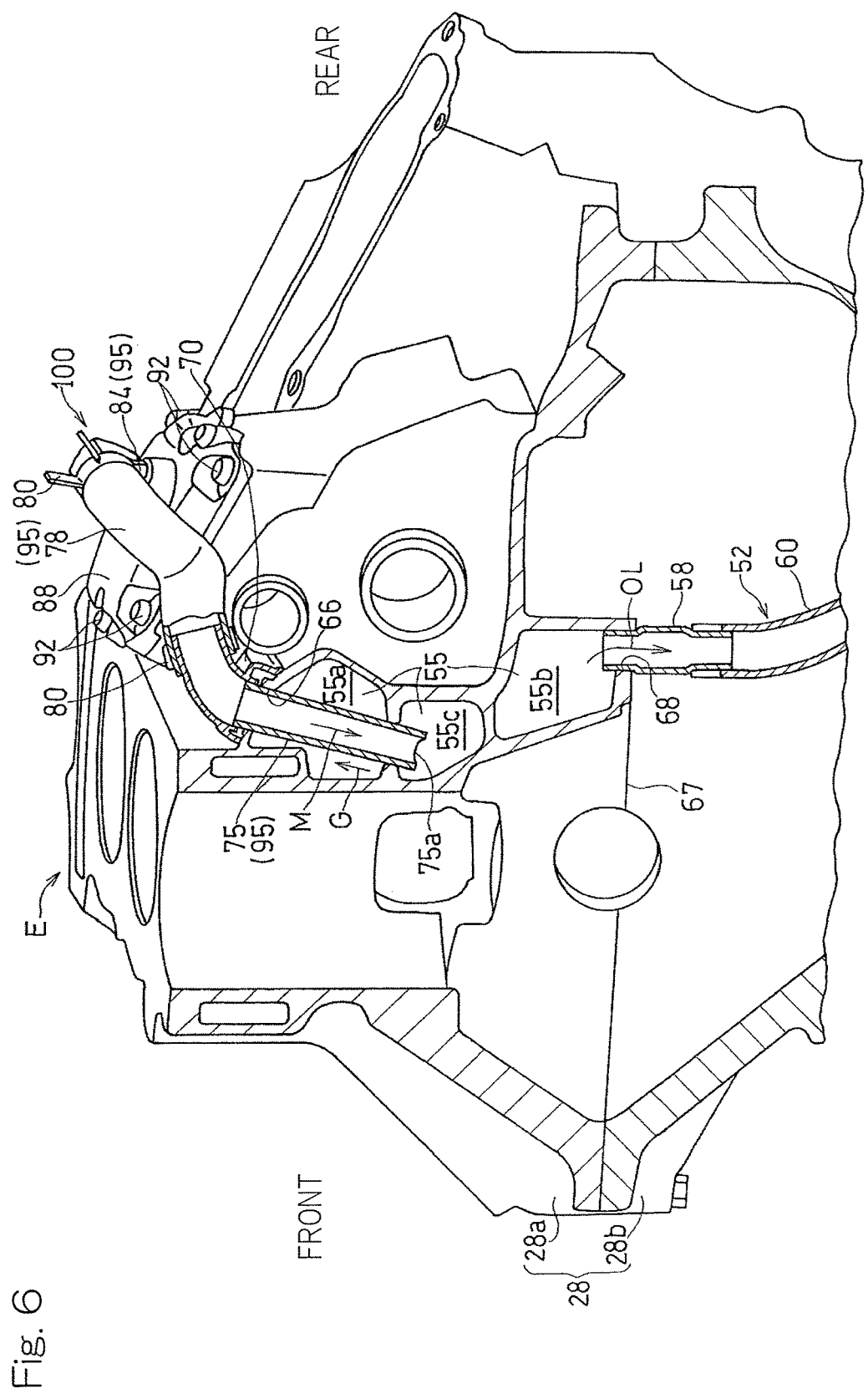
FIG. 6 is a longitudinal cross-sectional view showing the crank case.

The breather chamber 55 will be described. As shown in FIG. 6, the breather chamber 55 is formed within the upper crank case 28a by means of casting which is a type of die molding. Oil mist inside the combustion engine E is introduced to the breather chamber 55, and then gas-liquid separation for oil mist is performed in the breather chamber 55. The breather chamber 55 is provided rearward of the cylinders, and is formed so as to be elongated in the vertical direction. Specifically, the breather chamber 55 extends from an upper end portion of the upper crank case 28a to a lower end portion of the upper crank case 28a. However, the breather chamber 55 does not reach the lower crank case 28b. Thus, a sealing member can be omitted.

The breather chamber 55 has a labyrinth structure. Specifically, in the breather chamber 55, segmented chambers are arranged in the vertical direction, and the passages which allow the chambers to be communicated with each other are narrow. The breather chamber 55 of the present preferred embodiment includes three chambers, i.e., an uppermost chamber 55a, a lowermost chamber 55b, and an intermediate chamber 55c.

An upper opening 66 is formed in an upper portion of the breather chamber 55, and the lower opening 68 is formed in a lower portion of the breather chamber 55. The lower opening 68 is used for discharging the liquid component of oil mist having been subjected to gas-liquid separation in the breather chamber 55, and is open to a lower end surface 67 of the upper crank case 28a. The proximal end portion 58 of the oil return pipe 52 is press-fitted to the lower opening 68. The liquid component obtained through the gas-liquid separation performed in the breather chamber 55 is returned via the oil return pipe 52 to the oil reservoir 35 (FIG. 1).

Figure 7:
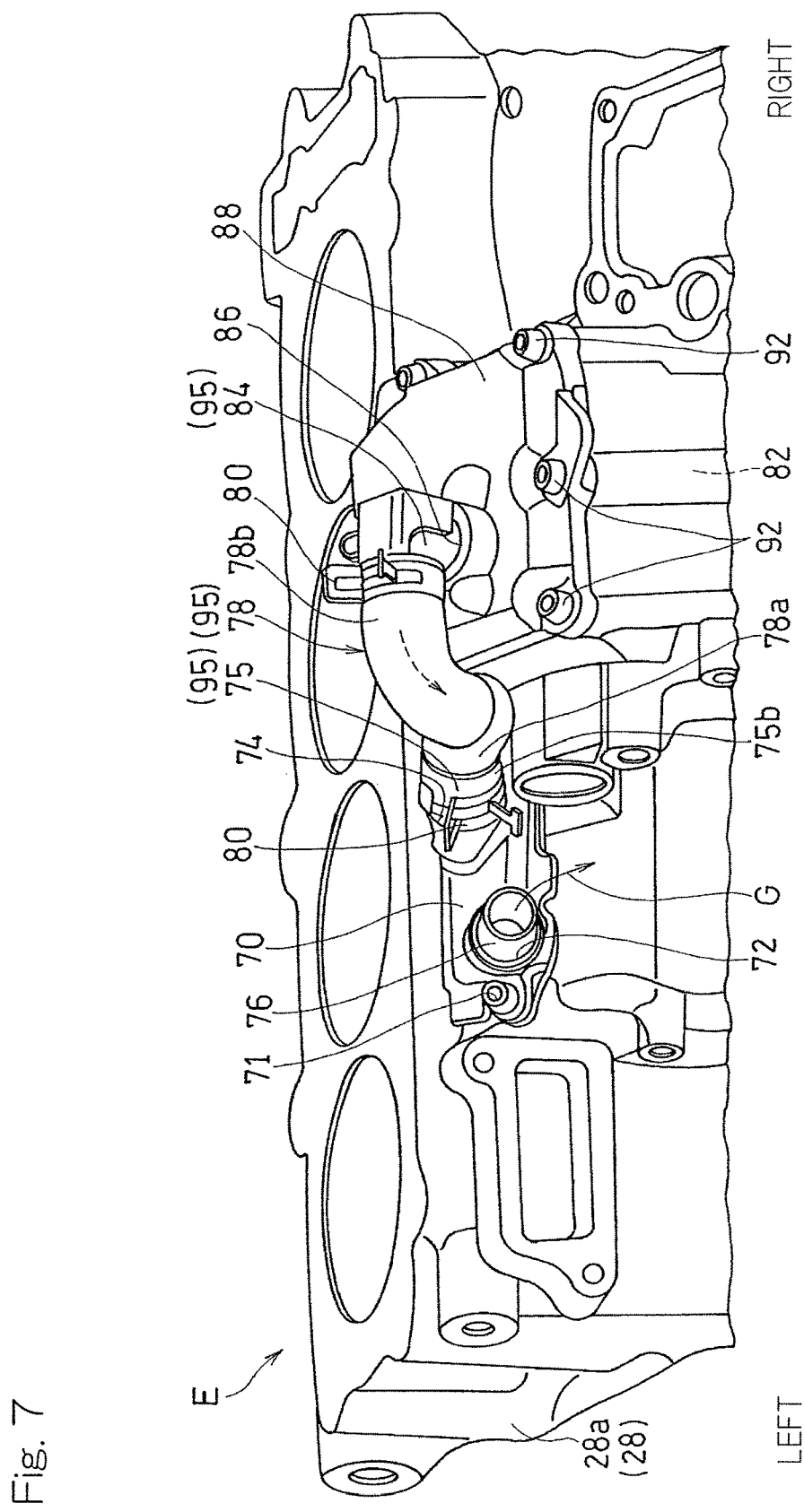
FIG. 7 is a perspective view of an upper portion of the crank case, diagonally viewed from rear and above.

As shown in FIG. 7, an upper cover 70 is mounted to the upper crank case 28a so as to cover an area above the upper opening 66. The upper cover 70 is mounted to the crank case 28 by means of a plurality of bolts 71. First and second through-holes 72 and 74 are formed in the upper cover 70 so as to be arranged in the vehicle widthwise direction. The first and second through-holes 72 and 74 allow the breather chamber 55 to be communicated with the outside.

A blowby drawing pipe 76 is mounted to the first through-hole 72 on the left side, and a discharge pipe (not shown) which forms a blowby gas passage is connected to the blowby drawing pipe 76. The discharge pipe is connected to the upstream side of the supercharger 42 in the air intake passage IP of the combustion engine E, specifically, to the air cleaner 40 in the present preferred embodiment. Blowby gas or the gas component obtained through gas-liquid separation performed in the breather chamber 55 is returned via the discharge pipe to the air intake passage IP.

A breather pipe 75 is connected to the second through-hole 74 on the right side. As shown in FIG. 6, the breather pipe 75 extends in a substantially vertical direction, and an outlet (lower end) 75a of the breather pipe 75 is disposed at a position distanced downwardly away from the upper opening 66 in the breather chamber 55. Specifically, the breather pipe 75 passes through the uppermost chamber 55a and is open to the intermediate chamber 55c.

As shown in FIG. 7, an upper end 75b of the breather pipe 75 projects upward from the upper cover 70. One end portion 78a of a breather hose 78 is connected to the upper end 75b of the breather pipe 75. The other end portion 78b of the breather hose 78 is connected to an introduction pipe 84. The introduction pipe 84 is connected to an introduction hole 86 formed in an upper portion of the crank chamber 82. Each of the breather pipe 75 and the introduction pipe 84 is connected to the breather hose 78 by means of a fixture 80 such as a band.

Figure 8:
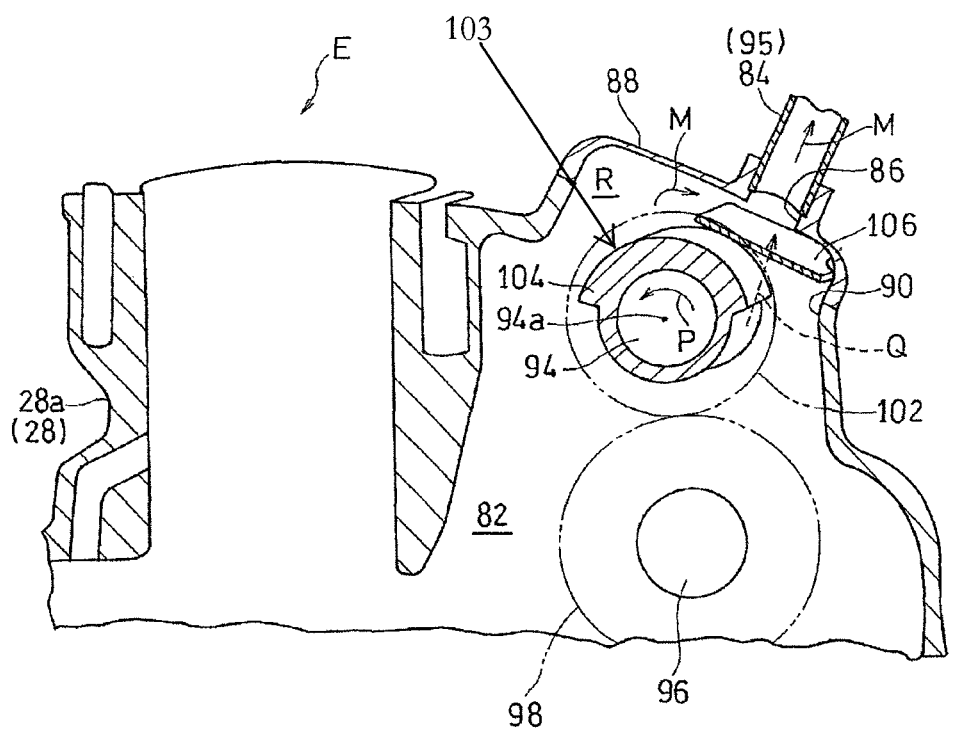
FIG. 8 is a longitudinal cross-sectional view of the upper portion of the crank case.

The introduction hole 86 is formed in an upper end portion of the crank case 28, at a position distanced rearward from the cylinder axes. Specifically, as shown in FIG. 8, a crank chamber opening 90 is formed in an upper portion of the crank chamber 82, and the crank chamber opening 90 is closed by a crank chamber cover 88. The crank chamber cover 88 is mounted to an upper surface of the crank case 28 by means of a plurality of bolts 92 (FIG. 7).

The introduction pipe 84 is disposed so as to project upward from the upper end portion of the crank case 28, and is connected to the breather hose 78 which passes outside of the combustion engine E. The introduction pipe 84, the breather hose 78, and the breather pipe 75 shown in FIG. 6 cooperate together to form a breather passage 95 which guides oil mist from the crank chamber 82 to the breather chamber 55. In the present preferred embodiment, these three separate members 84, 78, and 75 form the breather passage 95, but a single integrated member may form the breather passage 95. The breather chamber 55 and the breather passage 95 cooperate together to form a breather device 100 of the combustion engine E.

The breather passage 95 is formed in a reverse U shape protruding upward. Specifically, the introduction pipe 84 extends upward, the breather hose 78 extends in the vehicle widthwise direction, and the breather pipe 75 extends downward. Accordingly, it is possible to obtain the gas-liquid separation effect even in the breather passage 95. The outlet 75a of the breather pipe 75 is located lower than the inlet of the introduction pipe 84.

By providing the breather passage 95 outside the crank case 28, it is possible to make the breather passage 95 longer than in the case where the passage is formed inside the crank case 28, and in addition, it is possible to cool the gas flowing in the breather passage 95 by outside air. As a result, the gas-liquid separation effect in the breather passage 95 is improved. The breather chamber 55 is formed adjacent to a water jacket, on the air intake side (rear side) of the crank case 28. Accordingly, temperature rise in the breather chamber 55 is suppressed, and thus, the gas-liquid separation effect in the breather chamber 55 is improved.

As shown in FIG. 8, the introduction hole 86 is open to a high-pressure region R in the crank chamber 82. The high-pressure region R of the present preferred embodiment includes a region in which the pressure is increased due to a balancer shaft 94. The balancer shaft 94 is a type of a rotating body in which a protruding portion 103 serving as a weight is formed in an outer periphery portion thereof. Specifically, the introduction hole 86 is open in the vicinity of the balancer shaft 94 which is disposed at the uppermost position among a plurality of balancer shafts and a block member 106 is a plate positioned between the balancer shaft 94 and the introduction hole 86 to direct mist M to the introduction hole 86.

The balancer shaft 94 is rotatably connected to a counter shaft 96 which is rotatably connected to the crank shaft 26 (FIG. 1). Specifically, a counter gear 98 formed in the counter shaft 96 and a balancer gear 102 formed in the balancer shaft 94 mesh each other in the crank chamber 82. Since the balancer gear 102 has a smaller diameter and a smaller number of teeth than the counter gear 98, the balancer shaft 94 rotates at a high speed.

Since the balancer shaft 94 is disposed at the uppermost position in the crank chamber 82 and rotates in the direction of arrow P, air in a larger space below the balancer shaft 94 in the crank chamber 82 is collected (compressed) by the balancer gear 102 of the balancer shaft 94 rotating at a high speed, toward the narrow space above the balancer shaft 94. Accordingly, the high-pressure region R is formed in an upper portion of the crank chamber 82.

Figure 9:
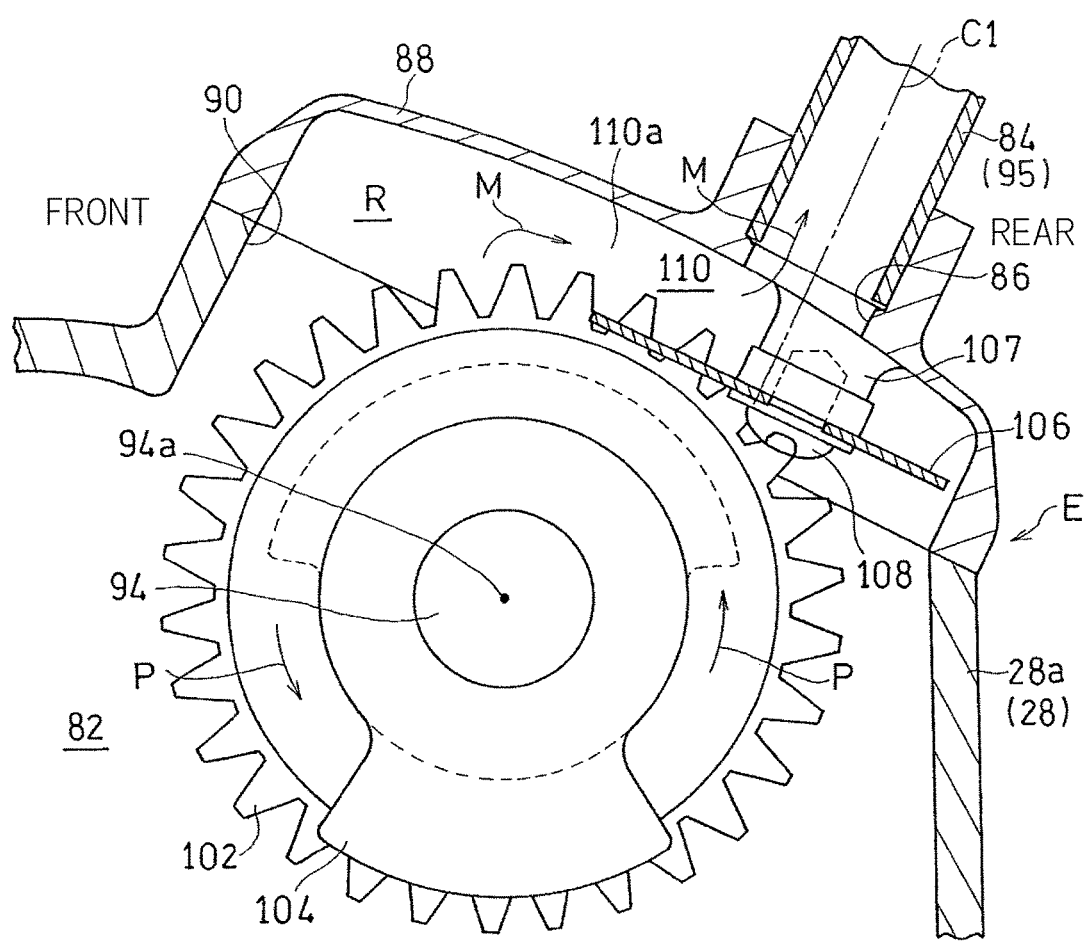
FIG. 9 is an enlarged longitudinal cross-sectional view of the vicinity of an introduction hole in the upper portion of the crank case.

In the crank chamber 82, above a balancer weight 104 provided in the balancer shaft 94, a block member 106 is disposed so as to face the balancer weight 104 in a radial direction. Specifically, the block member 106 is disposed between the balancer weight 104 and the introduction hole 86 in the crank chamber 82, and partially overlaps the balancer gear 102 in a side view. The block member 106 is formed by a plate member made of metal, and prevents the liquid component of oil mist from moving in the direction of arrow Q, indicated by the broken line, due to the centrifugal force of the balancer shaft 94 and directly entering the introduction hole 86. As shown in FIG. 9, the block member 106 is fixed to a boss 107 of the crank chamber cover 88 by means of a bolt 108.

An introduction passage 110 for oil mist to be introduced into the introduction hole 86 is formed in the crank chamber 82 by the block member 106. The introduction passage 110 allows the high-pressure region R of the crank chamber 82 and the breather passage 95 to be communicated with each other. The introduction passage 110 is formed so as to be perpendicular to the breather passage 95. In other words, the block member 106 is disposed such that outer plate surface thereof is perpendicular to the axis of the introduction pipe 84, i.e., an axis C1 of the introduction hole 86, as shown in FIG. 9.

An inlet 110*a* of the introduction passage 110 is disposed above an axis 94*a* of the balancer shaft 94 and so as to be displaced to the rear side in the rotation direction of the balancer shaft 94. That is, since the balancer shaft 94 is rotated in the direction of arrow P shown in FIG. 9, the inlet 110*a* of the introduction passage 110 is located above the axis 94*a* of the balancer shaft 94 and on the motorcycle front side.

The flows of blowby gas and oil of the combustion engine E of the present preferred embodiment will be described. When the combustion engine E shown in FIG. 1 is started, an air/fuel mixture leaks from gaps between pistons and cylinders, and blowby gas leaks into the crank chamber 82. Meanwhile, in the oil pan 29 below the crank chamber 82, oil having been supplied from the oil pan 29 and having lubricated and cooled portions of the combustion engine E is returned.

As shown in FIG. 9, oil mist M including blowby gas passes through the introduction passage 110 in the upper portion of the crank chamber 82, and is then guided to the inside (breather passage 95) of the introduction pipe 84. The oil mist M having been guided into the introduction pipe 84 passes through the breather hose 78 and the breather pipe 75 shown in FIG. 6, and is then introduced to the breather chamber 55.

The oil mist M having been introduced to the breather chamber 55 is subjected to gas-liquid separation in the breather chamber 55. Blowby gas G or the gas component moves to an upper portion of the breather chamber 55, and then is returned to the air cleaner 40 disposed on the upstream side of the supercharger 42 in the air intake passage IP of the combustion engine E shown in FIG. 1, via the discharge pipe (not shown) connected to the blowby drawing pipe 76 shown in FIG. 7.

The oil OL or the liquid component, obtained through gas-liquid separation performed in the breather chamber 55 shown in FIG. 4, passes through the oil return pipe 52, and is then returned to the oil pan 29 shown in FIG. 3.

According to the above configuration, since the distal end member 54 of the oil return pipe 52 has a tapered outer shape, even if the bottom portion 35*a* of the oil pan 29 is in a narrow shape, the outlet 52*a* of the oil return pipe 52 can be easily disposed in the bottom portion 35*a* of the oil reservoir 35. Accordingly, it is possible to prevent the oil OL from flowing backward in the oil return pipe 52 due to change in the internal pressure of the crank case 28.

When the internal pressure of the oil pan 29 becomes greater than the pressure in the oil return pipe 52 in a state where the outlet 52*a* of the oil return pipe 52 is located lower than the liquid surface in the oil pan 29, a part of the oil in the oil pan 29 may flow backward into the oil return pipe 52. However, in the above configuration, the passage area of the distal end member 54 is set to be smaller than the passage area of the main body portion 60 of the oil return pipe 52, and therefore, the pressure in the oil return pipe 52 is increased. Accordingly, even if the internal pressure of the oil pan 29 has increased, it is possible to prevent the oil in the oil pan 29 from flowing backward into the oil return pipe 52. Moreover, since the distal end member 54 has a flattened outer shape, the passage resistance in the distal end member 54 of the oil return pipe 52 is increased, and thus, it is possible to prevent the oil OL in the oil pan 29 from flowing backward in the oil return pipe 52.

The distal end member 54 is formed by a material having a rigidity higher than that of the main body portion 60 of the oil return pipe 52. Specifically, the main body portion 60 is formed by a rubber hose and the distal end member 54 is made of synthetic resin or metal. Thus, it is easy to handle the oil return pipe 52. Also, the distal end member 54 is hard and thus less likely to be broken. Therefore, it is possible to prevent the outlet 52*a* from being closed by being sandwiched by surrounding structures. Moreover, even if the difference between the internal pressure of the oil pan 29 and the internal pressure of the oil return pipe 52 is increased, the distal end member 54 does not deform to close the passage.

As described above, since the distal end member 54 of the oil return pipe 52 does not deform, the outlet 52*a* of the distal end member 54 can be disposed along with the oil strainer 41. That is, even if the outlet 52*a* of the distal end member 54 is sandwiched between the oil strainer 41 and the side wall 56 of the oil pan 29, the outlet 52*a* is less likely to be closed. Accordingly, the outlet 52*a* of the oil return pipe 52 can be stably disposed in the bottom portion 35*a* of the oil reservoir 35.

The oil strainer 41 includes the restriction portion 62 which restricts movement of the oil return pipe 52. Accordingly, it is not necessary to separately provide a restriction portion in the oil pan 29, and thus, it is possible to suppress increase of the number of parts.

The restriction portion 62 is configured to hold therein the distal end member 54 which is disposed close to the oil strainer 41, and thus, the restriction portion 62 can be downsized.

As shown in FIG. 6, since the oil mist M is drawn via the introduction pipe 84 which projects upward from the upper end portion of the crank case 28, the liquid component falls down due to its weight, whereby the liquid component included in the oil mist M to be guided to the breather chamber 55 is reduced. Accordingly, the efficiency in recovering the oil mist M is improved. That is, the liquid component to be recovered can be reduced, and the ratio of the gas component to be recovered can be increased. Moreover, since the breather chamber 55 is connected via the breather pipe 75, the degree of freedom in arrangement and structural design of the breather chamber 55 is improved.

In the combustion engine E equipped with the supercharger 42 shown in FIG. 1, the pressure on the upstream side of the supercharger 42 in the air intake passage IP tends to be a negative pressure, and thus, the liquid component tends to flow into the breather pipe 75. However, since the liquid component to be guided into the breather chamber 55 can be reduced as described above, entry of the liquid component into the blowby gas passage can be prevented. At this time, even if the pressure in the oil return pipe 52 communicated with the breather chamber 55 becomes a negative pressure, oil in the oil pan 29 does not flow backward into the oil return pipe 52 as described above.

The breather chamber 55 shown in FIG. 6 is formed so as to be elongated in the vertical direction, and is formed integrally with the crank case 28 by means of die molding. By forming the breather chamber 55 so as to be elongated in the vertical direction in this manner, gas-liquid separation of the oil mist is promoted.

The outlet 75a of the breather pipe 75 is disposed at a position distanced downwardly away from the upper opening 66 in the breather chamber 55. Accordingly, the oil mist M having been introduced into the breather chamber 55 can be prevented from going toward the upper opening 66 before being subjected to gas-liquid separation.

The introduction hole 86 shown in FIG. 8 is formed in the upper end portion of the crank case 28, and is open to the high-pressure region R in the crank chamber 82. Accordingly, the oil mist M is guided from the high-pressure region R into the introduction hole 86, whereby the pressure in the breather chamber 55 is increased. Thus, the liquid component having been discharged from the breather chamber 55 can be prevented from flowing backward into the breather chamber 55.

The high-pressure region R includes a region in which the pressure is increased due to the balancer shaft 94 disposed at the uppermost position in the crank chamber 82. Since the balancer shaft 94 at the uppermost position has less oil attached thereto, the efficiency in recovering the oil mist M is improved.

The block member 106 is provided in the crank chamber 82 and prevents the liquid component of the oil mist M from entering the introduction hole 86 due to the centrifugal force of the balancer shaft 94. Accordingly, entry of the liquid component of the oil mist M into the introduction hole 86 is suppressed, and thus, the efficiency in recovering the oil mist M is improved. Moreover, the high-pressure region R can be formed in a state where the liquid component of the oil mist M is separated by locating the block member 106 close to the balancer weight 104 so as to cause the oil mist M to collide with the block member 106.

The introduction passage 110 is formed in the crank chamber 82 by the block member 106, and the introduction passage 110 is perpendicular to the breather passage 95. That is, the passage for the oil mist M is deflected by the block member 106. Accordingly, before the oil mist M is guided into the breather passage 95, gas-liquid separation of the oil mist M is promoted in the introduction passage 110, and thus, the efficiency in recovering the oil mist M is further improved.

The present invention is not limited to the above preferred embodiment, and various additions, modifications, or deletions may be made without departing from the gist of the invention. For example, the outlet 75a of the breather pipe 75 may be located in a chamber, of the breather chamber 55, that is at least lower than the uppermost chamber 55a and higher than the lowermost chamber 55b, and the location thereof is not limited to the configuration in the above preferred embodiment. Moreover, the rotating body which forms the high-pressure region R is not limited to the balancer shaft 94. Therefore, such changes and modifications are also included the scope of the present invention.

With reference to FIG. 1 to FIG. 9, a preferred embodiment of the breather device 100 of the combustion engine E has been described. However, the description also encompasses the engine oil recovery device 69 according to applied modes 1 to 9 below.

[Mode 1]
An oil recovery device for a combustion engine comprising:
an oil reservoir formed in an oil pan of the combustion engine; and
an oil return pipe configured to return, to the oil reservoir, a part of oil present in portions other than the oil reservoir of the combustion engine, wherein
a distal end portion forming an outlet of the oil return pipe is disposed in a bottom portion of the oil reservoir, and the distal end portion has a tapered outer shape.

[Mode 2]
The oil recovery device for the combustion engine according to mode 1, wherein
a passage area of the distal end portion is set to be smaller than a passage area of the other portion of the oil return pipe.

[Mode 3]
The oil recovery device for the combustion engine according to mode 1 or 2, wherein
the distal end portion is composed of a distal end member which is a member separate from the oil return pipe and which is mounted to the oil return pipe, and
the distal end member is made from a material having a rigidity higher than that of the oil return pipe.

[Mode 4]
The oil recovery device for the combustion engine according to mode 3, further comprising:
an oil strainer disposed in the oil pan and configured to suck oil, wherein
an outlet of the distal end portion is disposed between the oil strainer and a side wall of the oil pan.

[Mode 5]
The oil recovery device for the combustion engine according to mode 4, wherein
the oil strainer includes a restriction portion configured to restrict movement of the oil return pipe.

[Mode 6]
The oil recovery device for the combustion engine according to mode 5, wherein
the restriction portion holds therein the distal end portion of the oil return pipe.

[Mode 7]
The oil recovery device for the combustion engine according to any one of modes 1 to 6, wherein
the combustion engine includes a supercharger and a breather chamber into which oil mist in the combustion engine is introduced and in which gas-liquid separation of the oil mist is performed, a liquid component obtained through gas-liquid separation performed in the breather chamber is returned from the oil return pipe to the oil reservoir, and a gas component obtained through gas-liquid separation performed in the breather chamber is introduced to an upstream side of the supercharger in an air intake passage of the combustion engine.

REFERENCE NUMERALS

26 . . . crank shaft
28 . . . crank case
42 . . . supercharger
55 . . . breather chamber
66 . . . upper opening
68 . . . lower opening
75 . . . breather pipe
75a . . . outlet of breather pipe
82 . . . crank chamber
84 . . . introduction pipe
86 . . . introduction hole
94 . . . balancer shaft (rotating body)
95 . . . breather passage
100 . . . breather device
106 . . . block member
110 . . . introduction passage
E . . . combustion engine
IP . . . air intake passage
M . . . oil mist
R . . . high-pressure region

What is claimed is:

1. A breather device for a combustion engine comprising:
a breather chamber into which oil mist in the combustion engine is introduced, the breather chamber having formed therein a labyrinth structure in which gas-liquid separation of the oil mist is performed; and
a breather passage configured to guide, into the breather chamber, oil mist from a crank chamber in which a crank shaft is disposed, wherein
the breather passage is disposed so as to project upward from an upper end portion of a crank case and passes outside of the combustion engine to be connected to the breather chamber;
an introduction hole to which an introduction pipe is connected in the upper end portion of the crank case,
the introduction hole is open to a high-pressure region in the crank chamber;
the combustion engine includes a rotating body having a protruding portion formed in an outer periphery portion thereof and configured to be rotatably driven in the crank chamber, and
the introduction hole is open to a region in which pressure is increased due to rotation of the rotating body in the crank chamber.

2. The breather device for the combustion engine as claimed in claim 1, wherein
the breather chamber is formed so as to be elongated in a vertical direction,
an upper opening through which a gas component of the oil mist is discharged is formed in an upper portion of the breather chamber, and
a lower opening through which a liquid component of the oil mist is discharged is formed in a lower portion of the breather chamber.

3. The breather device for the combustion engine as claimed in claim 2, wherein an outlet of a breather pipe forming the breather passage and communicated with the breather chamber is disposed at a position distanced downwardly away from the upper opening in the breather chamber.

4. The breather device for the combustion engine as claimed in claim 3, wherein the combustion engine includes a supercharger, and
further comprising a blowby gas passage connecting the upper opening to an upstream side of the supercharger in an air intake passage of the combustion engine.

5. The breather device for the combustion engine as claimed in claim 1, wherein
the combustion engine includes a plurality of balancer shafts configured to be rotatably driven in the crank chamber, the balancer shafts forming the rotating body, and
the introduction hole is open adjacent to a balancer shaft that is disposed at an uppermost position among the plurality of the balancer shafts.

6. The breather device for the combustion engine as claimed in claim, 1 further comprising a block member provided in the crank chamber and configured to prevent a liquid component of the oil mist from entering the introduction hole due to centrifugal force of the rotating body.

7. The breather device for the combustion engine as claimed in claim , 1 further comprising an introduction passage formed in the crank chamber and communicated with the breather passage; and
the introduction passage being perpendicular to an axis of the introduction hole.

8. The breather device for the combustion engine as claimed in claim 1, wherein the breather passage projects upward from a position of the crank case, which position is away from a cylinder block.

9. The breather device for the combustion engine as claimed in claim 1 wherein:
the breather passage is composed of a pipe member separate from the crank case and the cylinder block; and
the pipe member is disposed so as to project upward from the upper end portion of the crank case and passes outside of the combustion engine to be connected to the breather chamber.

10. The breather device for the combustion engine as claimed in claim 1, wherein:
the crank chamber includes a gear chamber which accommodates a change gear train engaged with the crank shaft; and
the breather passage is connected with the crank case above the gear chamber.

11. The breather device for the combustion engine as claimed in claim 1, wherein the breather passage is formed in a reverse U shape protruding upward.

12. The breather device for the combustion engine as claimed in claim 11, wherein the breather passage extends upward from the crank case and extends in a rotation axis direction of the combustion engine so as to be connected with the breather chamber.

13. The breather device for the combustion engine as claimed in claim 1, wherein the breather chamber is formed within the crank case.

14. The breather device for the combustion engine as claimed in claim 13, wherein the breather chamber is formed adjacent to a water jacket of the crank case.

15. The breather device for the combustion engine as claimed in claim 13, wherein:

the crank case includes an upper crank case and a lower crank case; and the breather chamber extends from an upper end portion of the upper crank case to a lower end portion of the upper crank case.

16. A breather device for a combustion engine comprising:

a breather chamber into which oil mist in the combustion engine is introduced, the breather chamber having formed therein a labyrinth structure in which gas-liquid separation of the oil mist is performed;

a breather passage configured to guide, into the breather chamber, oil mist from a crank chamber in which a crank shaft is disposed, wherein an introduction pipe forming the breather passage and communicated with the crank chamber is disposed so as to project upward from an upper end portion of a crank case, an introduction hole to which the introduction pipe is connected is formed in the upper end portion of the crank case;

the combustion engine includes a plurality of balancer shafts configured to be rotatably driven in the crank chamber;

the introduction hole is open to a region in which pressure is increased due to rotation of the balancer shafts in the crank chamber, and the introduction hole is open adjacent to a balancer shaft that is disposed at an uppermost position among the plurality of the balancer shafts.

17. A breather device for a combustion engine comprising:

a breather chamber into which oil mist in the combustion engine is introduced, the breather chamber having formed therein a labyrinth structure in which gas-liquid separation of the oil mist is performed; and a breather passage configured to guide, into the breather chamber, oil mist from a crank chamber in which a crank shaft is disposed, wherein an introduction pipe forming the breather passage and communicated with the crank chamber is disposed so as to project upward from an upper end portion of a crank case;

an introduction hole to which the introduction pipe is connected is formed in the upper end portion of the crank case;

the combustion engine includes a rotating body having a protruding portion formed in an outer periphery portion thereof and configured to be rotatably driven in the crank chamber;

the introduction hole is open to a region in which pressure is increased due to rotation of the rotating body in the crank chamber; and further comprising a block member provided in the crank chamber and configured to prevent a liquid component of the oil mist from directly entering the introduction hole due to the centrifugal force of the rotating body.

* * * * *